(12) United States Patent
Witzigreuter (10) Patent No.: US 6,346,341 B1
(45) Date of Patent: Feb. 12, 2002

(54) AIR DELIVERY SYSTEM WITH VOLUME-CHANGEABLE PLENUM FOR METAL-AIR BATTERY

(75) Inventor: John D. Witzigreuter, Kennesaw, GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/216,660

(22) Filed: Dec. 18, 1998

(51) Int. Cl.[7] ................................................ H01M 2/02
(52) U.S. Cl. ............................ 429/27; 429/48; 429/97; 429/148; 429/151; 429/163
(58) Field of Search .............................. 429/27, 48, 72, 429/101, 148, 151, 155, 163, 96–100, 82

(56) References Cited

U.S. PATENT DOCUMENTS

| | | |
|---|---|---|
| 2,468,430 A | 4/1949 | Derksen |
| 2,632,032 A | 3/1953 | Winckler |
| 3,507,704 A | 4/1970 | Webb |
| 3,697,326 A | 10/1972 | Jammet |
| 4,177,327 A | 12/1979 | Mathews et al. |
| 4,209,091 A | 6/1980 | Lieberman |
| 4,262,062 A | 4/1981 | Zatsky |
| 4,493,880 A | 1/1985 | Lund |
| 4,620,111 A | 10/1986 | McArthur et al. |
| 4,687,714 A | 8/1987 | Oltman et al. |
| 4,857,885 A | 8/1989 | Umerez |
| 4,894,295 A | 1/1990 | Cheiky |
| 4,913,983 A | 4/1990 | Cheiky |
| 5,093,212 A | 3/1992 | Lloyd et al. |
| 5,206,576 A | 4/1993 | Jasinski |
| 5,258,239 A | 11/1993 | Kobayashi |
| 5,434,020 A | 7/1995 | Cooper |
| 5,554,452 A | 9/1996 | Delmolino et al. |
| 5,639,568 A | 6/1997 | Pedicini et al. |
| 5,641,585 A | 6/1997 | Lessing et al. |

FOREIGN PATENT DOCUMENTS

| | | |
|---|---|---|
| JP | 06223882 | 12/1994 |
| RU | 2106722 | 3/1998 |
| WO | WO 9744848 | 11/1997 |

Primary Examiner—Carol Chaney
Assistant Examiner—Susy Tsang
(74) Attorney, Agent, or Firm—Alston & Bird LLP (57) ABSTRACT

A ventilation system for a metal-air battery is disclosed. The metal-air battery has one or more air cathodes, one or more air pathways from the air cathode to a reactive gas source, a closure member associated with each of the air pathways to selectively prevent the flow of gas through the air pathways and one or more volume-changeable plenums in fluid communication with the air pathway and the air cathode. When the battery is not in use, the closure member is closed and the door is closed to save the battery life time. When the battery is activated, the air pathway is opened and the volume of the plenum is increased to introduce fresh air from the outside to the plenum. A method of producing electricity using a metal-air battery is also disclosed.

11 Claims, 5 Drawing Sheets

AIR DELIVERY SYSTEM WITH VOLUME-CHANGEABLE PLENUM FOR METAL-AIR BATTERY

CROSS-REFERENCE TO RELATED APPLICATIONS

The following patent applications, all of which are commonly assigned and are incorporated herein by reference, contain related subject matter and are being filed concurrently with the present application.

"CYLINDRICAL METAL-AIR BATTERY WITH A CYLINDRICAL PERIPHERAL AIR CATHODE", Ser. No. 09/215,820, now U.S. Pat. No. 6,274,261;

"AIR MANAGER SYSTEMS FOR METAL-AIR BATTERIES UTILIZING A DIAPHRAGM OR BELLOWS", Ser. No. 09/216026;

"AIR MOVER FOR A METAL-AIR BATTERY UTILIZING A VARIABLE VOLUME ENCLOSURE", Ser. No. 09/216118;

"DIFFUSION CONTROLLED AIR VENT WITH AN INTERIOR FAN", Ser. No. 09/215,879;

"UNIFORM SHELL FOR A METAL-AIR BATTERY", Ser. No. 09/216,114, now U.S. Pat. No. 6,235,418;

"LOAD RESPONSIVE AIR DOOR FOR A METAL-AIR CELL", Ser. No. 09/216,115;

"GEOMETRY CHANGE DIFFUSION TUBE FOR METAL-AIR BATTERIES", Ser. No. 09/216,273; and "AIR-MANAGING SYSTEM FOR METAL-AIR BATTERY USING RESEALABLE SEPTUM", Ser. No. 09/216,343, now U.S. Pat. No. 6,168,877.

FIELD OF THE INVENTION

The present invention relates generally to batteries, and more particularly relates to an air delivery system with a volume-changeable plenum for a metal-air battery.

DESCRIPTION OF THE RELATED ART

Metal-air battery cells include an air permeable cathode and a metallic anode separated by an aqueous electrolyte. During discharge of a metal-air battery, such as a zinc-air battery, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from ambient air as a reactant in the electrochemical reaction rather than a heavier material, such as a metal or metallic composition. Metal-air battery cells are often arranged in multiple cell packs within a common housing to provide a sufficient amount of power output. The result is a relatively light-weight battery.

To operate a metal-air battery cell, it is necessary therefore to provide a supply of oxygen to the air cathodes of the cells. An air pathway and a plenum are typically used to supply the air cathodes with the oxygen. The air pathway serves as a conduit of the oxygen and the plenum diffuses the oxygen evenly over the air cathodes so as to increase efficiency of the electrodes. The plenum, therefore, has to have a certain volume to work properly while the battery is operating. The air pathway is generally sealed or closed during non-use by sealing tapes, plugs, mechanical doors, etc., because water vapor and oxygen in the ambient air may cause the cell to flood, dry out, or discharge in certain circumstances, thereby leading to a reduction in cell efficiency and life. Furthermore, after a period of use, residual water vapor and oxygen in the plenum may cause similar problems, at least immediately after the air pathway is sealed or closed.

Thus, a need exists for an improved metal-air battery cell that overcomes or minimizes the above-referenced disadvantages of prior art metal-air battery cells.

SUMMARY OF THE INVENTION

The present invention satisfies the above-described needs by providing a novel metal-air battery. The metal-air battery of the present invention comprises one or more air cathodes; one or more air pathways from the air cathode to a reactive gas source; a closure member associated with each of the air pathways to selectively prevent the flow of gas through the air pathways; and one or more volume-changeable plenums in fluid communication with the air pathway and the air cathode.

The present invention also comprises a method of producing electricity using a metal-air battery comprising one or more air cathodes, an enclosure member at least partially defining a volume-changeable plenum in fluid communication with the air cathode, and at least one closable air pathway in fluid communication with the plenum and ambient air surrounding the enclosure. The method comprising the steps of opening the air pathway so that the ambient air can flow to said plenum through the pathway; and increasing the volume of the plenum so that air is drawn through the pathway to the plenum.

In another disclosed embodiment, the present invention comprises an electric device using the metal-air battery mentioned above.

Accordingly, it is an object of the present invention to provide an improved metal-air battery.

Another object of the present invention is to provide a metal-air battery that is relatively simple and inexpensive to manufacture.

A further object of the present invention is to provide a ventilation system for a metal-air battery that does not require any electric mechanisms to operate it.

Yet another object of the present invention is to provide a metal-air battery that reduces the amount of air in communication with the air cathode when the battery is not in use and increases the amount of air in communication with the air cathode when the battery is in use.

Another object of the present invention is to provide a metal-air battery with an initial charge of fresh reactive gas for reaction with an air cathode when the battery is activated.

These and other objects, features and advantages of the present invention will become apparent after a review of the following detailed description of the disclosed embodiments and the appended drawing and claims.

DESCRIPTION OF THE PREFERRED EMBODIMENT

Referring now in more detail to the drawing, in which like numerals refer to like elements throughout the several views, FIGS. 1, 2, 3A and 3B show a disclosed embodiment of the metal-air battery 10 of the present invention. The metal-air battery 10 includes a plurality of metal-air cells 12, such as zinc-air cells, enclosed within an upper cell case 14 or a lower cell case 16. The present invention is useful with both primary and secondary metal-air cells. Primary and secondary metal-air cells are known in the art and suitable components for primary metal-air cells are described in U.S. Pat. No. 5,721,065 (the disclosure of which is incorporated herein by reference). Secondary cells also can be used in the present invention, such as that described in U.S. Pat. No. 5,569,551 (the disclosure of which is incorporated herein by reference). Although the use of the present invention is disclosed as useful with a zinc-air battery, it should be understood that the present invention is applicable to other types of metal-air battery cells.

Figure 1:
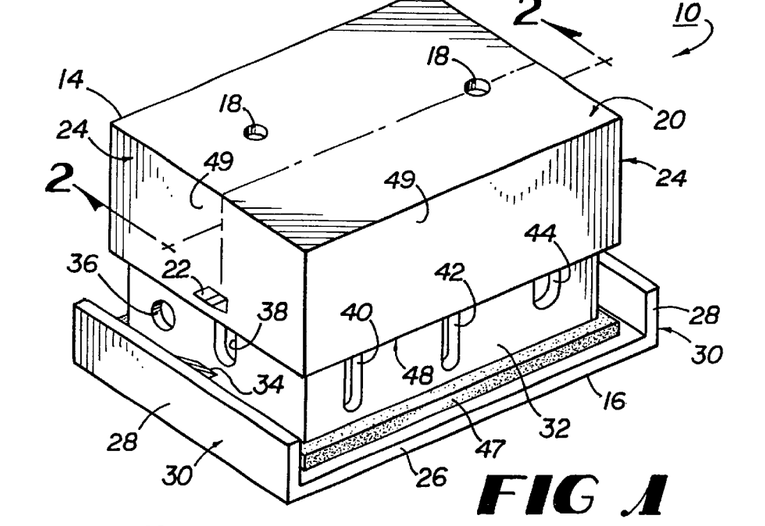
FIG. 1 is a perspective view of a disclosed embodiment of the battery of the present invention.
Figure 2:
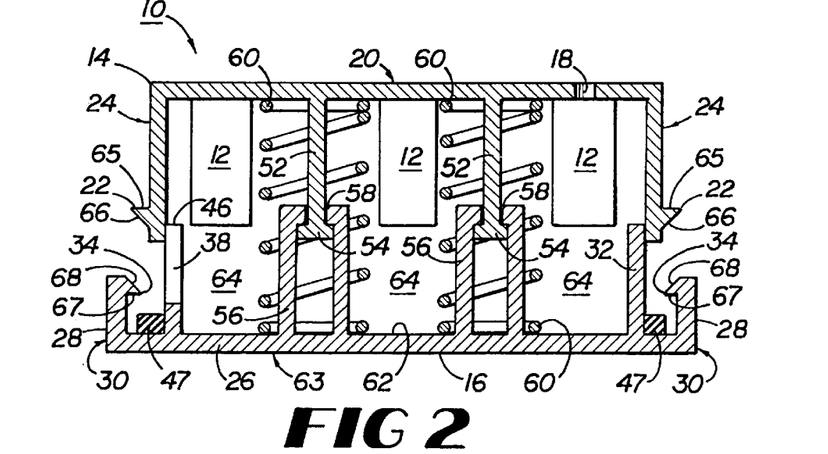
FIG. 2 is a vertical cross-sectional view taken along line 2—2 of the battery shown in FIG. 1.

The upper case 14, which is a rectangular box shape with the bottom face open, contains the cells 12 inside and optionally has two openings 18 on the top face 20 for injecting electrolyte into the cells and venting or exhausting evolved gas. The upper case 14 also has two projections 22 on its opposite side faces 24. The lower case 16 has a tray 26 with two leg portions 28 projecting upwardly at the side edges 30 and a four-sided wall 32 sitting on the tray 26 and extending upwardly. Each leg portion 28 has a projection 34 extending inwardly. The wall 32 has several openings, such as a circular opening 36, and slits or vents 38, 40, 42, 44. The vents 38, 40, 42, 44 have a variety of widths and each has a round end at its bottom portion. The vents 38, 40, 42, 44 may be open at the top edge 46. On the top face of the tray 16, a circumferential elastomeric gasket 47, which may be made of a rectangular sheet of rubber with a large rectangular hole at the center, is placed to surround the wall 32 and pressed by a circumferential bottom edge 48 of a circumferential wall 49 of the upper case 14 and the top surface of the tray 16 to seal the case.

Within the upper case 14, a plurality of metal-air cells 12 are secured to the underside of the top face 20 of the upper case 14. Two identical upper pillars 52 of a telescopic mechanism are also secured to the underside of the top face 20 of the upper case 14. At the other end of each pillar 52 is formed a salient portion 54. A lower hollow pillar 56 of the telescopic mechanism surrounds each the upper pillar 52 and has a smaller opening at the top end 58. The salient portion 54 of each upper pillar 52 is smaller than the hollow tube of each lower pillar 56 but larger than the smaller opening 58 at the top end so as to prevent the upper pillar 52 from being removed completely from the lower pillar 56. The upper and lower pillars 52, 56 are surrounded by a coil compression spring 60. Opposite ends of the springs 60 contact the underside of the top face 20 of the upper case 14 and the top side 62 of the bottom face 63 of the lower case 16. The springs 60 apply a force to the upper case 14 and lower case 16 tending to bias the two case halves apart.

The upper case 14 and lower case 16 define a volume-changeable plenum 64. The plenum 64 is disposed under and around the cells 12 so as to diffuse a reactive gas from the plenum 64 to the cells 12.

The outside dimension of the four-sided wall 32 of the lower case 16 is slightly smaller than the inside dimension of the box-shaped upper case 14 so that the upper and lower cases fit together telescopically, and, thus, permit the wall 32 to slide on the inside of the box-shaped upper case. This telescopic arrangement permits the upper case 14 to move upwardly and downwardly with respect to the lower case 16. When the upper case 14 is in the position shown in FIG. 2, the vents 36, 38, 40, 42, 44 permit the ambient air surrounding the battery 10 to enter the plenum 64 and also permit air inside the plenum 64 to escape to the outside.

Figure 3:
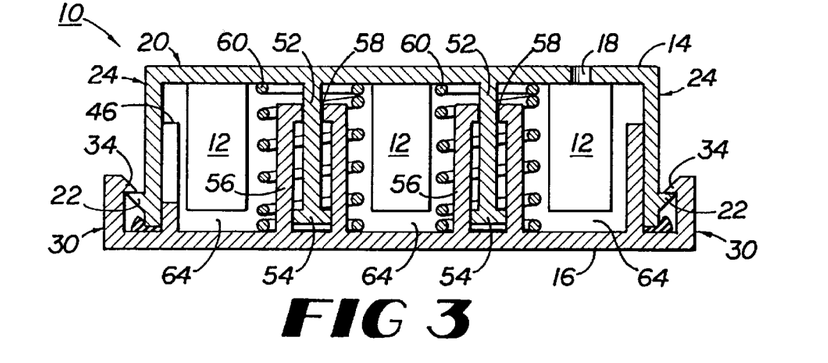
FIG. 3 is an alternate vertical cross-sectional view taken along line 2—2 of the battery shown in FIG. 1 when the battery is in a closed condition.

When the battery 10 is stored, inactive or otherwise not operative, the upper and lower cases 14, 16 are pressed together so that the battery case may be in a collapsed or closed position, as shown in FIG. 3, and the projections 22 of the upper case 14 engage the projections 34 of the portion 28 of the lower case 16. The projections 22 have a horizontally flat portion 65 at their upper portion and a wedge shape 66 at their lower portion. The projections 34, on the other hand, have a horizontally flat portion 67 at their lower part and a wedge shape 68 at their upper part. Thus, the two wedgeshaped portions 66, 68 slide on their surfaces to push outwardly when the upper and lower cases 14, 16 are pressed together. When the battery case is in a collapsed position, the projection 34 of the lower case 16 moves back or springs back inwardly to engage with the projection 22 on its flat portion 67 like a ratchet so that the battery case may be retained in the collapsed position. In the collapsed or closed position (FIG. 3), the box-shaped upper case 14 covers the openings 36, 38, 40, 42, 44 thereby closing them. The circumferential bottom edge 48 of the circumferential wall 49 is pressed on the circumferential elastomeric gasket 47 placed on the top face of the tray 16 such that the battery case may be airtight., and, thus, preventing the ambient air surrounding the battery 10 from entering the plenum 64 and also preventing air inside the plenum 64 from escaping to the outside.

When the battery is ready to use, the projections 34 are moved outwardly against the elastic force of the leg portions 28. Thus, the engaged projections 22, 34 are released and the upper case 14 is popped open by the elastic force of the coil spring 60. At the same time, the volume-changeable plenum 64 is expanded and a negative gauge pressure is produced inside of the case, which causes ambient air surrounding the battery 10 to be drawn through the vents 36, 38, 40, 42, 44 during the opening movement. The fresh air, including a reactive gas; i.e., oxygen, is therefore, introduced into the expanded plenum 64 and supplies the air cathodes (not shown) with oxygen for immediate use. The inflow of air through the vents 36, 38, 40, 42, 44 during the opening movement also causes turbulence inside of the case which aids in the diffusion of oxygen evenly over the air cathodes (not shown). After a while, when the battery is operating at steady state, the oxygen makes it way to the air cathodes (not shown) by diffusion. Thus, no expensive air moving device is needed.

When the battery is not in use, the upper and lower cases 14, 16 are pressed together against the elastic force of the coil spring 60 to the collapsed position (FIG. 3). As the upper and lower cases 14, 16 move toward each other, the plenum 64 becomes smaller which thereby cause air inside the plenum 64 to be exhausted through the vents 36, 38, 40, 42, 44. When completely closed, the upper case 14 covers the vents 36, 38, 40, 42, 44, as described above, and prevents air from both entering and exiting the plenum 64.

The four-sided wall 32 of the lower case 16 can have any number or any shape of vents 36, 38, 40, 42, 44. It is within the skill of the art to design the vents to provide sufficient ventilation for optimum battery performance during steady state, as well as transition state, use. The distance that the upper and lower cases 14, 16 move in the opening and closing movement directly affects a volume change ratio of the plenum 64 and can also be adjusted for optimum battery performance. If that distance is relatively short, the volume change ratio is relatively small and produces relatively small pressure differences; if that distance is relatively long, the volume change ratio is relatively large and produces relatively large pressure differences. The distance may also be varied by the planar area of the cell 10. In general a cell with a large planar area needs a longer distance to have the same diffusion air flow from the peripheral vents, that is, the same supplying current. If the cell with circumferential gap, which may be referred to the distance, communicating with the plenum at the cell's periphery is tested, the experimental data suggests a somewhat linear relationship between plenum thickness, which is equal to the gap height, and a limiting current. Useful closing distances are typically from 0.06 to 0.5 inches if the wall 32 has many vents.

Since a relatively small positive pressure remains in the plenum 64 after all the openings 36, 38, 40, 42, 44 are closed, it is desirable to provide the plenum 64 with a vent hole with a check valve as described further hereinbelow.

The top view of the upper case 14 is rectangular in this embodiment, but it will be understood that the upper case can have any desired shape, such as polygonal or circular, as described later. Any number or any shape of the engaging projections 22, 34 may also be used in accordance with the present invention as long as the engaging mechanism retains the upper and lower cases 14, 16 in the collapsed or closed position and can be relatively easily released so that the upper and lower cases can assume the open position. The upper and lower cases 14, 16 can be made from any suitable material, however, plastic is preferred because it is gas-impermeable, relatively easy and inexpensive to form into a desired shape, and because it can be self-lubricating so as to facilitate the sliding mechanism. Metal or other materials may also be used.

The coil spring 60 is of a suitable size so as to provide sufficient force for opening the upper and lower cases 12, 14. The elastic force may be adjusted to achieve the optimal pop-opening rate and to give suitable resistance for closing by hand. However, the spring 60 can also be designed so as to provide more space for the cells 12.

Another disclosed embodiment of the present invention is shown in FIGS. 4, 5, 6, 7A, 7B and 7C. The metal-air battery 10' includes a cylindrical cell 70 enclosed within a circular upper cell case 72 and a circular lower cell case 74.

Figure 4:
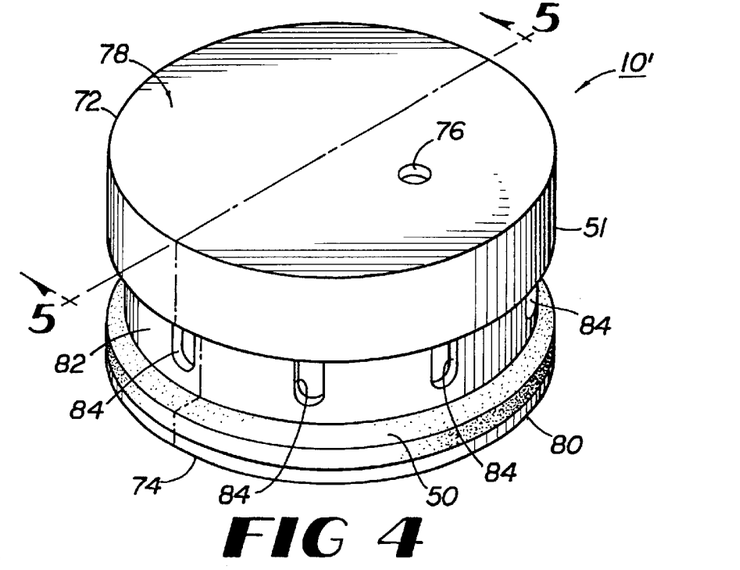
FIG. 4 is a perspective view of another disclosed embodiment of the battery of the present invention.
Figure 5:
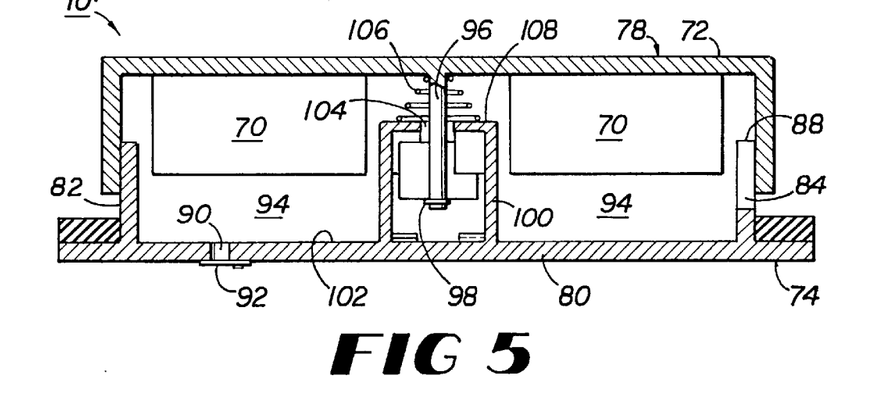
FIG. 5 is a vertical cross-sectional view taken along line 5—5 of the battery shown in FIG. 4.

The upper case 72, which is shaped like an upside down cup, has an optional opening 76 on the top face 78 for injecting electrolyte into the cell 70 and ventilating evolved gas. The lower case 74 has a base 80 and a circular wall 82 extending upwardly therefrom. The wall 82 has several slit openings or vents 84 each having the same size and shape for symmetry. Each opening 84 is round at the bottom ending and may be open at the top edge 88. The base 80 has an opening 90 and a reducing valve 92 to leak pressured air from a volume-changeable plenum 94 during battery collapse or closing. In a similar manner as described in the first embodiment, a circular elastomeric gasket 50 may be disposed on the top face of the base 80 of the lowercase 74. The gasket is pressed between the bottom edge of the peripheral vertical wall 51 and the top face of the base 80 to seal off the battery when the case is in the closed position.

Inside the upper and lower cases 72, 74 (collectively "the battery case"), a cell 70 is secured to the underside of the top face 78 of the upper case 72. An upper pillar 96 of a telescopic mechanism is also secured to the underside at the top face 78 of the upper case 72. At the distal end of the pillar 96 a snap ring 98 is secured to retain an opening mechanism described later. A lower pillar 100 of the telescopic mechanism is secured to the center of the top face 102 of the base 80. The hollow pillar 100 surrounds a lower portion of the upper pillar 96 and has a smaller opening 104 at the top end of the lower pillar 100. A coil spring 106 surrounds the upper pillar 96 and is disposed between the topside of the top face 78 of the upper case 72 and a circular plate 108 at the top end of the lower pillar 100 so as to push the upper case 72 and the lower case 74 apart. Therefore, the opening, which is defined by the circular plate 108 at the top end of the lower pillar 100 is smaller than the diameter of the coil spring 106.

Figure 7A:
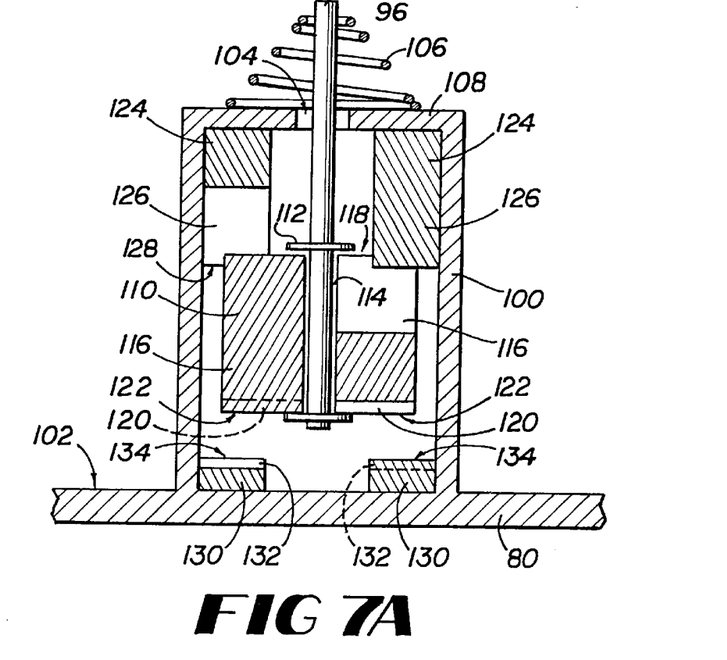
FIG. 7A is a partial vertical cross-sectional view of a pop-open mechanism of the battery shown in FIG. 4.
Figure 7B:
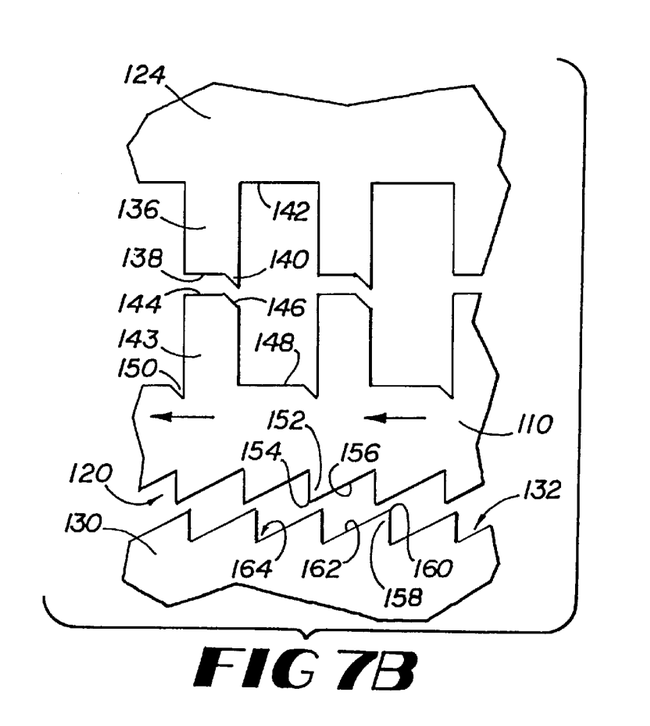
FIG. 7B is partial detail view of the pop-open mechanism shown in FIG. 7A.
Figure 7C:
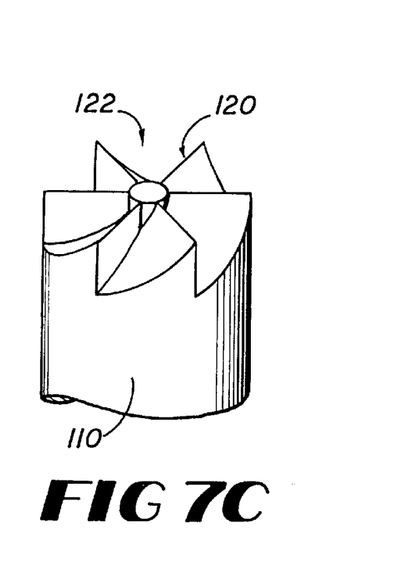
FIG. 7C is an enlarged perspective view of a portion of a pivoting mechanism of the pop-open mechanism shown in FIG. 7.

In FIGS. 7A, 7B, and 7C, the opening mechanism is illustrated. The upper pillar 96 holds a rotatable cylindrical member 110 between the snap ring 98 and another snap ring 112 secured to the upper pillar 96. The cylindrical member 110 has a clearance hole 114 for the upper pillar 96, rectangular teeth 116 on the top face 118, and saw teeth 126 on the bottom face 122. Inside the hollow pillar 100, a stationary cylinder 124 with rectangle teeth 126 on the bottom face 128 is secured to the circular plate 108, and a stationary cylinder 130 with saw teeth 132 on the top face 134 is secured to the base plate 80. Each rectangular tooth 136 of the stationary cylinder 124 has a plateau 138 and a triangle portion 140 on the right corner with neighboring concavities 142, as shown in FIG. 7B. On the top face 118 of the rotatable cylindrical member 110, each rectangle tooth 143 has a plateau 144 and a chamfered right corner 146 with neighboring concavities 148. Each cavity 148 has a triangular cavity 150 on the right. The triangular portion 140 fits the chamfered corner 146 and the cavity 150. On the bottom face 122 of the rotatable cylindrical member 110, each saw tooth 152 has a peak 154 and a wedge-like slope 156 at the right hand side. On the top face 134 of the stationary cylinder 130, each saw tooth 158 has a peak 160 and a wedge-like slope 162 on the left-hand side. Thus, both saw teeth 126, 132 engage with each other. A typical bottom face 122 of the rotatable cylindrical member 110 or a typical bottom face 134 of the stationary cylinder 130 is shown in FIG. 7C.

Figure 6:
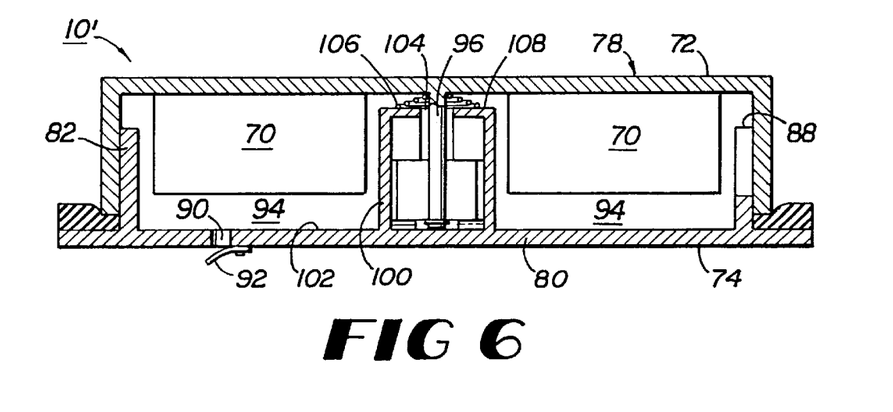
FIG. 6 is an alternate vertical cross-sectional view taken along line 5—5 of the battery shown in FIG. 4 when the battery is in a closed condition.

When the battery is in a collapsed or closed position, the plateau 138 of the tooth 136 of the stationary cylinder 124 coincides with the plateau 144 of the tooth 116 of the rotatable cylinder 110 such that the rotatable cylindrical member 110 is kept in a lower position in the hollow pillar 100 (FIG. 6). That means the upper case 72 is in the collapsed position. When the upper case 72 and the lower case 74 are pressed together to move the upper shaft 96 downwardly, the peak 154 of each saw tooth of the rotatable cylinder 110 hits on the wedge-like slope 162 of the stationary cylinder 130 and the peak 160 of each saw tooth 158 of the stationary cylinder 130 hits on the wedge-like slope 156 of the rotatable cylinder 110. Because of the slope, the peak 154 moves left in FIG. 7B while the upper case 72 and the lower case 74 are pressed together; i.e., while the rotatable cylinder 110 and the stationary cylinder 130 are pressed together. Here, the term "moves left" means "rotates clockwise" if the rotatable cylinder 110 is viewed from the top. After the peak 154 of the saw tooth 152 reaches a notch 164 of the counter saw tooth of the stationary cylinder 130, the clockwise movement of the rotatable cylinder 110 is blocked by each vertical wall of the saw teeth of both the rotatable cylinder 110 and the stationary cylinder 130.

When the pressure is released, the coil spring 106 pushes the upper case 72 back to the open position in a manner described hereafter. The rotatable cylinder 110 is lifted to bring the rectangle tooth 136 into contact with the corresponding rectangle tooth 116 when the spring 106 pushes up on the upper case 72 and the rotatable cylinder 110. However, since the rotatable cylinder 110 has been moved left about half of the breadth of the rectangle tooth 136 as described before, the left corner of the tooth 136 hits on the chamfered corner 146 and each tooth 143 of the rotatable cylinder 110 rotates to fall into each corresponding concavity 142. Thus, the rotatable cylinder 110 is retained in the open position (FIG. 5).

When the upper case 72 and the lower case 74 are pressed together, the rotatable cylinder 110 is pushed downward to bring the saw teeth 120 at the bottom face 122 into contact with those at the top face 134 of the stationary cylinder 130. The peak 154 of each saw tooth 152 of the rotatable cylinder 110, thereby, hits on the wedge-like slope 162 of the stationary cylinder 130 to move clockwise as described above. Then, the pressure is released so that the rotatable cylinder 110 is pushed upwardly by the spring 106 to bring the rectangular teeth 116 into contact with the rectangular teeth 136 again. The triangular portion 140 slides on the chamfered corner 146 to move the rotatable cylinder 110 slightly clockwise such that the plateau portion 144 of the rotatable cylinder 110 sits on the plateau portion 138 of the stationary cylinder 124. Thus, the battery case is kept in the closed position again and the rotatable cylinder 110 is kept in the lower position in the hollow cylinder 100.

When the battery 10' is stored or is otherwise inactive, the upper and lower cases 72, 74 are pressed together so that the battery case is in the collapsed or closed position (FIG. 6). Thus, the openings 84 are closed by the side wall of the upper case 72 and the volume-changeable plenum 94 is also collapsed (FIG. 6).

When the battery is ready to be used, the battery is opened by the elastic force of the coil spring 106 with the opening mechanism described above (FIG. 5). At the same time, the volume-changeable plenum 94 is expanded and a negative gauge pressure is produced inside of the case, which causes air outside of the openings 84 to be drawn into the plenum 94 during the pop-open movement. The fresh air, including a reactive gas; i.e., oxygen, is introduced into the expanded plenum 94 and supplies the air cathode (not shown) with oxygen for immediate use. The inflow of air through the openings 84 also causes turbulence within the plenum 94 which causes the oxygen to diffuse evenly over the air cathode (not shown).

When the battery is not in use, the upper and lower cases 72, 74 are pressed together against the elastic force of the coil spring 106 to the collapsed position (FIG. 6). As the upper and lower cases 72, 74 move toward each other, the plenum 94 becomes smaller which causes air inside the plenum 94 to be exhausted through the openings 84 just before they are closed completely by the upper case 72 and through the opening 90 after the openings 84 are closed. The reducing valve 92 is composed of a plate like a petal and a hinge (not shown) securing the valve 92 to the bottom face of the base 80. The valve 92 closes the opening 90 with a weak closing force provided by a spring at the hinge (not shown) unless there is a positive gauge pressure in the plenum 94.

The cylindrical wall 82 of the lower case 74 may have any number or any shape of vent openings 84. It is within the skill of the art to design the vents to provide sufficient ventilation for optimum battery performance during steady state, as well as transition state, use. The distance that the upper and lower cases 72, 74 move in the opening and closing movement directly affects the volume change ratio of the plenum 94 and can also be adjusted for optimum battery performance as previously described.

The top view of upper case 72 is circular in this embodiment, but it can be any desired shape, such as polygonal, as mentioned above. Any suitable mechanism for opening and closing the upper and lower cases 72, 74 can be employed in accordance with the present invention.

Figure 10A:
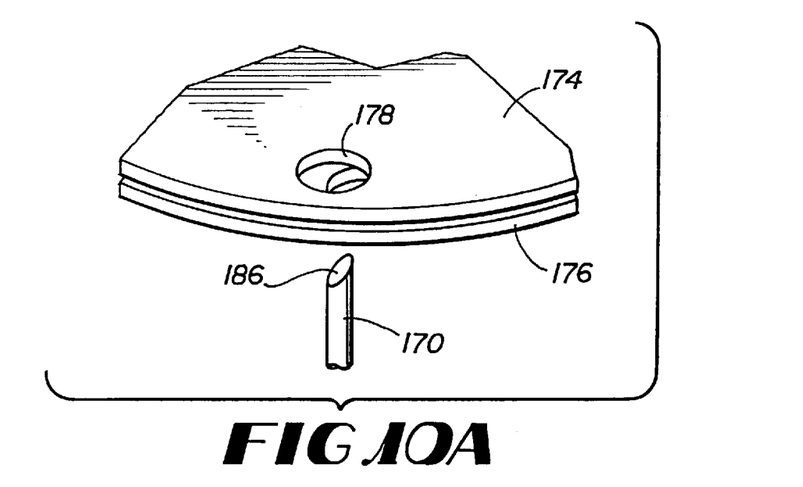
FIG. 10A is a partial perspective view of a portion of the closure mechanism of the battery shown in FIG. 8.
Figure 10B:
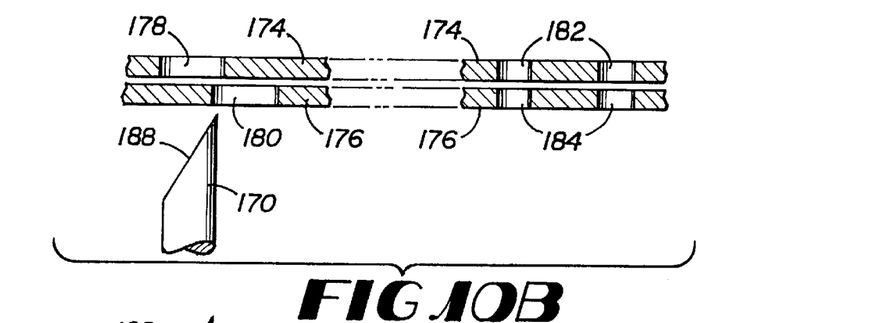
FIG. 10B is partial detail cross-sectional view of the closure mechanism shown in FIG. 10A.
Figure 10C:
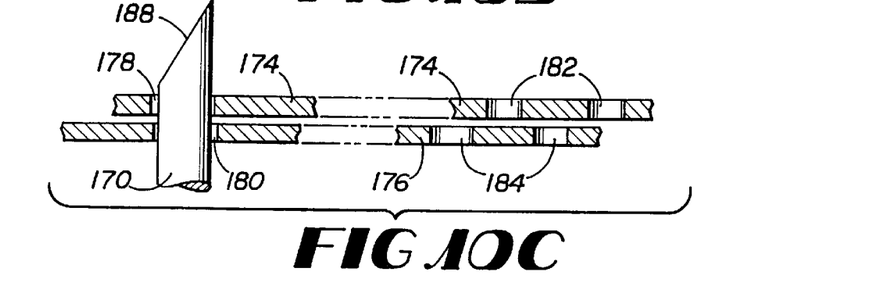
FIG. 10C is partial detail cross-sectional view of the closure mechanism shown in FIG. 10A.

Another embodiment of the present invention is illustrated in FIGS. 8, 9, 10A, 10B and 10C. Although most of the parts of this battery 10" are commonly used in the previous embodiment (FIGS. 4–7C), the battery has a mechanical door located beneath an air cathode (not shown) of a metal-air cell 70, a plurality of pillars 170 for a door opening and closing mechanism, and a plurality of openings 172 for air communication. The mechanical door comprises two circular disks 174, 176 with a plurality of holes 178, 180, 182, 184 formed therein and a spring (not shown) to push it back to an open position. Each pillar 170 for the door opening and closing mechanism has a wedge-like portion 186 at the top end (FIGS. 10A, 10B and 10C). The base 80 has a plurality of openings 172 so that the air can enter the plenum 94 from the outside and can also exit the plenum 94 through the openings 172.

Figure 8:
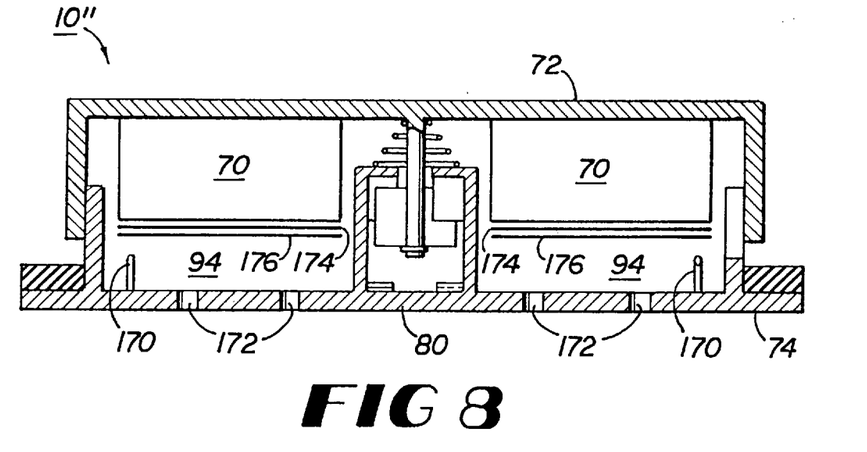
FIG. 8 is a vertical cross-sectional view of another disclosed embodiment of the battery of the present invention.
Figure 9:
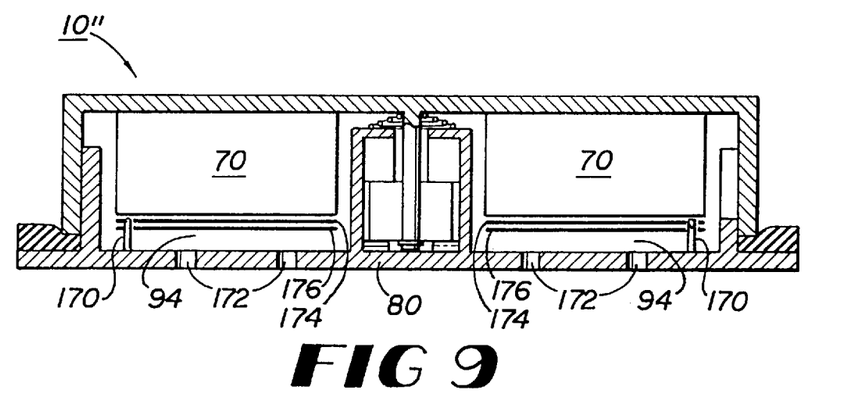
FIG. 9 is an alternate vertical cross-sectional view of the battery shown in FIG. 8 when the battery is in a closed condition.

The circular disks 174, 176 are disposed just beneath the cell 70. Therefore, the volume-changeable plenum 94 is separated from the air cathode (not shown) by the circular disks 174, 176. Air freely enters and exits the plenum 94 through the openings 172. The openings 172 can be diffusion tubes that restrict the flow of excess air and water vapor or larger tubes for continuous operation. The circular disks 174, 176 may have many openings 182, 184 formed therein because only a small space is available for diffusion between the openings and the cathode. However, the openings 172 may prevent solid particles and other harmful materials from entering the battery cells 70.

The opening and closing of the mechanical door coincides with a volume change of the plenum 94 as described hereafter. The mechanical door is open; i.e., the openings 182, 184 on both disks 174, 176 align with each other, by the action of a spring (not shown) when the battery case is in an open position (FIG. 10B). However, the mechanical door is closed; i.e., the openings 182, 184 do not align with each other (FIG. 10C), because the lower disk 176 is moved by the pillars 170. Each pillar 170 extends through a corresponding opening 180 for alignment and the slant cut end 186 of each pillar 170 moves the lower disk 176 when the case is collapsed or closed. The use of the mechanical door to isolate the metal-air cell from ambient air provides a longer shelf life than for conventional metal-air battery cells.

Figure 11:
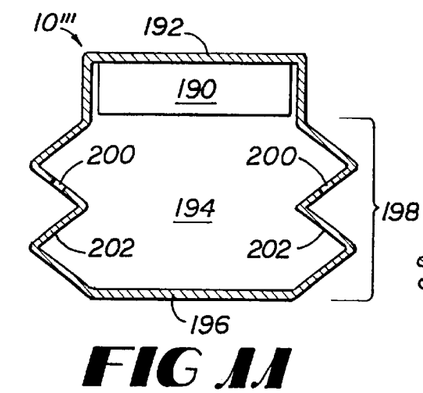
FIG. 11 is a vertical cross-sectional view of another disclosed embodiment of the battery of the present invention.
Figure 12:
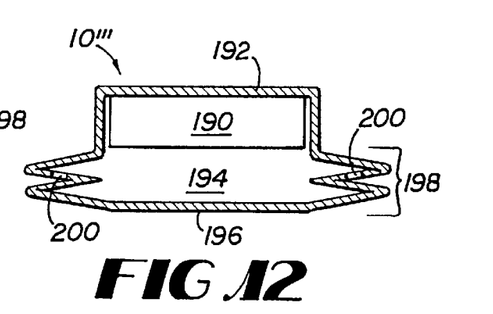
FIG. 12 is a vertical cross-sectional view of the battery shown in FIG. 11 showing the battery in a closed condition.

Another embodiment of the present invention is illustrated in FIGS. 11 and 12. The battery 10''' includes a metal-air cell 190 secured within an upper case 192, which may be shaped like an upside down cup. Disposed under the cell 190 is a volume-changeable plenum 194. The plenum 194 is also defined by a lower case 196 including a bellows portion 198 with openings 200 formed therein. The bellows can be made of rubber, plastics, and other suitable flexible materials, so that the openings 200 can be closed by the adjacent rib 202 of the bellows facing the openings 200 when the battery case is in a collapsed or closed position (FIG. 12).

When the battery is stored or is otherwise inactive, the upper and lower cases 192, 196 are pressed together thereby compressing the bellows so that the battery case is in a collapsed position (FIG. 12) and so that the openings 200 are closed as described above.

When the battery 10''' is ready for use, the battery case is popped-open by the elastic force of bellows or is stretched by hand (FIG. 11). At the same time, the volume-changeable plenum 194 is expanded and the openings 200 accordingly become open. A negative gauge pressure is produced in the plenum 194 and causes ambient air surrounding the battery 10''' to flow into the plenum through the openings or vents 200. Fresh air, including a reactive gas; i.e., oxygen, therefore, is introduced into the expanded plenum 194 to supply the air cathode with oxygen for immediate use.

When the battery 10'''is not in use, the upper and lower cases 192, 196 are pressed together against the elastic force of the bellows to the collapsed position (FIG. 12). At the same time, the plenum 194 becomes smaller so as to exhaust air inside the plenum through the openings 200. The lower case 196 optionally includes a reducing valve, of the type described above, such that a positive air pressure in the plenum 194 is avoided.

Further the opening and closing motion facilitates air movement and fresh air introduction into the plenum 186 and the air cathode (not shown). Thus, the volume-changeable plenum works as a fresh air pump or an air manager of the metal-air battery which is disclosed, for example, in U.S. Pat. No. 5,356,729.

Figure 13:
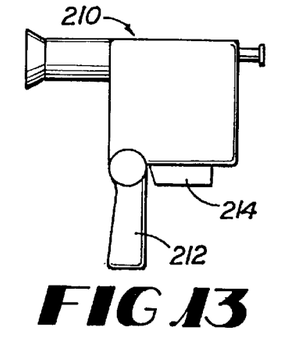
FIG. 13 is a schematic view of a disclosed embodiment of an electric device employing a battery of the present invention showing the electric device in an operational condition.
Figure 14:
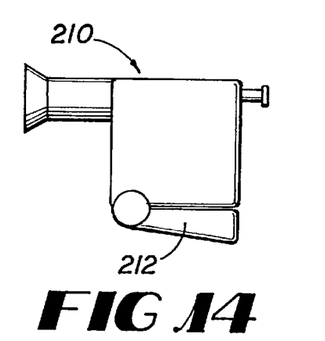
FIG. 14 is a schematic view of the electric device shown in FIG. 13 showing the electric device in non-operational condition.

Another embodiment of the present invention is illustrated in FIGS. 13 and 14. The battery of the present invention is illustrated as being installed in a camcorder 210, which has a foldable handle 212 to hold the body of the camcorder while shooting. Any type of batteries described theretofore can be used in the camcorder 210. When the handle 212 is unfolded (FIG. 13), the battery case 214 expands thereby expanding the volume-changeable plenum so that fresh air enters the plenum. When the handle 212 is folded (FIG. 14); i.e., the camcorder is not in use, the expanded battery case is pushed back by the handle 212 to the closed position and volume-changeable plenum is compressed expelling air therefrom and the openings are closed to save battery life.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A battery comprising:
   an enclosure base comprising a peripheral wall surrounding one or more cells, each of said one or more cells including an air electrode;
   one or more vents disposed in said peripheral wall;
   a closure member positioned relative to said enclosure base so as to define a volume-changeable plenum;
   said enclosure base and said closure member having a first relative position wherein said plenum has a volume and a second relative position wherein said plenum has a relatively larger volume;
   said one or more vents being closed when said enclosure base and said closure member are in said first position and said vents being open when said enclosure base and said closure member are in said second position; and
   said one or more cells being in fluid communication with a reactive gas source when said enclosure base and said closure member are in said second position.

2. The battery of claim 1, wherein said enclosure base and said closure member are spring biased into said second relative position.

3. The battery of claim 2, further comprising a releasable lock holding said enclosure base and said closure member in said first relative position.

4. A battery comprising:
   one or more cells, each including an air electrode, said one or more cells contained in a case, said case comprising a first member, a second member, and a spring disposed between said first and second members such that said spring applies a force to the first and second members to bias the two members apart; and
   said first and second members having a first relative position such that said one or more cells are isolated from a reactive gas source, and a second relative position such that said one or more cells are exposed to said reactive gas source.

5. The battery of claim 4, wherein when said first and second members are in said first relative position, said case is in a collapsed position, and when said first and second members are in said second relative position, said case is in an expanded position.

6. The battery of claim 4, wherein when said first and second members are in said first relative position said case has a volume, and when said first and second members are in said second relative position said case has a relatively larger volume.

7. The battery of claim 4, wherein said case comprises one or more openings positioned to expose said one or more cells to said reactive gas source when said first and second members are in said second relative position, and positioned to isolate said one or more cells from said reactive gas source when said first and second members are in said first relative position.

8. A battery comprising: one or more cells, each including an air electrode, said one or more cells contained in a case member that defines a volume-changeable plenum, said case member comprising one or more ribs arranged as a bellow portion; at least one vent disposed on said one or more ribs; and said case member having a first relative position such that said bellow portion is collapsed and said at least one vent is closed, and a second relative position such that said bellow portion is expanded and said at least one vent is open.

9. The battery of claim 8, wherein in said first relative position said plenum has a volume and in said second relative position said plenum has a relatively larger volume.

10. The battery of claim 8, wherein in said first relative position said one or more cells are isolated from a reactive gas source and in said second relative position said one or more cells are exposed to said reactive gas source.

11. The battery of claim 8, wherein in said first relative position said at least one vent is closed by an adjacent one of said ribs.

* * * * *